United States Patent
Poirier

(10) Patent No.: US 9,505,279 B2
(45) Date of Patent: Nov. 29, 2016

(54) KING PIN COUPLER

(71) Applicant: Bertin Poirier, Rimouski (CA)

(72) Inventor: Bertin Poirier, Rimouski (CA)

(*) Notice: Subject to any disclaimer, the term of this patent is extended or adjusted under 35 U.S.C. 154(b) by 0 days.

(21) Appl. No.: 14/121,708

(22) Filed: Oct. 9, 2014

(65) Prior Publication Data

US 2015/0097354 A1    Apr. 9, 2015

(30) Foreign Application Priority Data

Oct. 9, 2013   (CA) .................................... 2829520

(51) Int. Cl.
*B62D 53/06*   (2006.01)
*B60D 1/01*   (2006.01)
*B62D 53/08*   (2006.01)

(52) U.S. Cl.
CPC ........... B60D 1/015 (2013.01); B62D 53/0807 (2013.01); B62D 53/0814 (2013.01); *B62D 53/08* (2013.01); *B62D 53/0885* (2013.01)

(58) Field of Classification Search
CPC ............. B60D 1/015; B62D 53/0814; B62D 53/0807; B62D 53/08; B62D 53/0885

USPC .................................. 280/433, 438.1, 441.1
See application file for complete search history.

(56) References Cited

U.S. PATENT DOCUMENTS

| | | | | |
|---|---|---|---|---|
| 2,442,914 A | * | 6/1948 | Apgar | B62D 53/08 280/431 |
| 3,580,610 A | * | 5/1971 | Warren et al. | 280/432 |
| 3,888,513 A | * | 6/1975 | Pilz et al. | 280/421 |
| 4,065,149 A | * | 12/1977 | Roth | 280/432 |
| 4,121,853 A | * | 10/1978 | McKay | 280/433 |
| 4,174,118 A | * | 11/1979 | Heyne et al. | 410/31 |
| 5,411,281 A | * | 5/1995 | Poirier | 280/433 |
| 6,371,504 B1 | * | 4/2002 | Alguera Gallego et al. | 280/433 |
| 6,554,310 B2 | * | 4/2003 | Babin | 280/441.1 |

* cited by examiner

*Primary Examiner* — Joseph Rocca
*Assistant Examiner* — Marlon A Arce
(74) *Attorney, Agent, or Firm* — Eric Fincham

(57) ABSTRACT

A fifth wheel for use between a tractor and a trailer wherein the trailer has a king pin comprising a frame mounted on the tractor, a lower plate member, an intermediate plate member formed of a low friction material and mounted on the lower plate member, an upper plate member covering the low friction layer, a coupling support mounted on the upper plate member and a king pin retention device mounted on the coupling support.

6 Claims, 6 Drawing Sheets

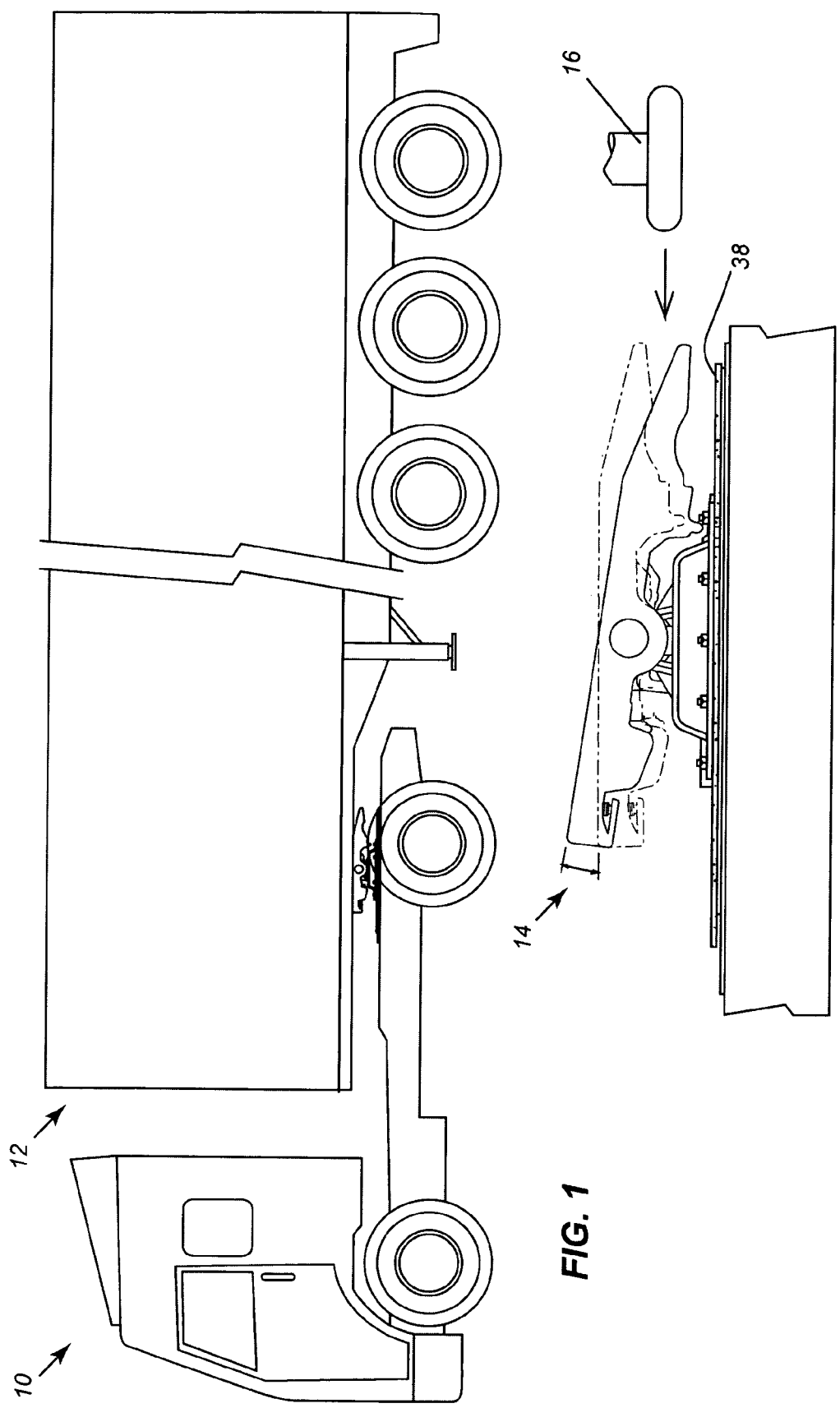

KING PIN COUPLER

FIELD OF THE INVENTION

The present invention relates to a fifth wheel assembly for coupling a tractor to a trailer.

BACKGROUND OF THE INVENTION

As is well known in the art, tractor trailers use a coupling known as a fifth wheel where the trailer has one portion of the coupling and the truck or tractor unit has a further portion thereof. Conventionally, the fifth wheel construction for the truck unit comprises a substantially round flat plate to form a tractor bearing surface. The semi-trailer also includes a plate member with a king pin extending downwardly to locate and seat within a slot within the fifth wheel portion mounted on the truck unit. There are provided means for locking the king pin in place when the truck is put in position with the two portions of the fifth wheel engaging together.

Fifth wheel arrangements are used in a wide variety of applications to releasably couple the trailer to the tractor. The frames of the tractors to which the fifth wheel assemblies are mounted typically comprise a pair of longitudinally extending C-shaped frame members that are supported by the wheel on axle members of the vehicle. The frame members are laterally spaced apart from each other so as to provide a planer surface for resisting normal and twisting forces after the fifth wheel is secured thereto and placed in operation, thereby transferring the payload of the trailer onto the frame members.

The king pin receptor device generally may include a jaw assembly for securing the king pin of the trailer to the tractor. The jaws may be movable to secure and release the king pin extending from the trailer. There may also be an arrangement wherein the jaws are such that an operator can manually toggle the jaws between a position in which the king pin is secured to the jaws and a position in which the king pin is released from the jaws. When the king pin is secured in the jaws, the trailer is secured to the tractor and may be towed. When the king pin is released from the jaws, the king pin may be removed from the jaws decoupling the trailer from the tractor. An example of a king pin assembly is illustrated in U.S. Pat. No. 7,931,291 which is hereby incorporated by reference.

It is known in the art that friction between the two bearing surfaces develops and can lead to problems. In order to overcome this, it is known to place a lubricant between the two bearing surfaces. The lubricant, which is usually grease, helps but has not been found to be the solution since it is necessary to frequently replenish the grease. Moreover, the lubricant can be squeezed out of place and in cold weather, the lubricant can stiffen which can lead to handling performance problems and cause dangerous vehicle handling characteristics.

SUMMARY OF THE INVENTION

It is an object of the present invention to provide a fifth wheel for use between a tractor and a trailer wherein the trailer includes a king pin, comprising a frame mounted on the tractor, a lower plate member, an intermediate plate member formed of a low friction material, the intermediate plate member being mounted on the lower plate member, an upper plate member covering the low friction layer, a coupling support mounted on the upper plate member, and a king pin retention device mounted on the coupling support.

The connection between the tractor unit and a trailer unit allows for a free rotation movement and reduces friction of the coupling system to a minimum. The articulation always remains perpendicular to the trailer resulting in a uniform and constant contact between a fixed platform and a "fifth wheel assembly" even on winding roads or irregular surfaces. A truck equipped with this assembly can pull any type of trailer regardless of its configuration or the model of the coupling system.

The system of the present invention is installed directly on the tractor unit and is permanently bolted thereon to allow the attachment of any type of semi-trailer to it. The use of the unit will increase fuel and lubricant economy and will also help to increase savings on maintenance expenses and replacement parts.

BRIEF DESCRIPTION OF THE DRAWINGS

Having thus generally described the invention, reference will be made to the accompanying drawing illustrating an embodiment thereof, in which:

FIG. 1 is a side elevational view of a tractor and trailer utilizing the fifth wheel of the present invention;

FIG. 2 is a side view illustrating the insertion of the king pin into the king pin retaining device;

DETAILED DESCRIPTION OF THE INVENTION

Figure 3:
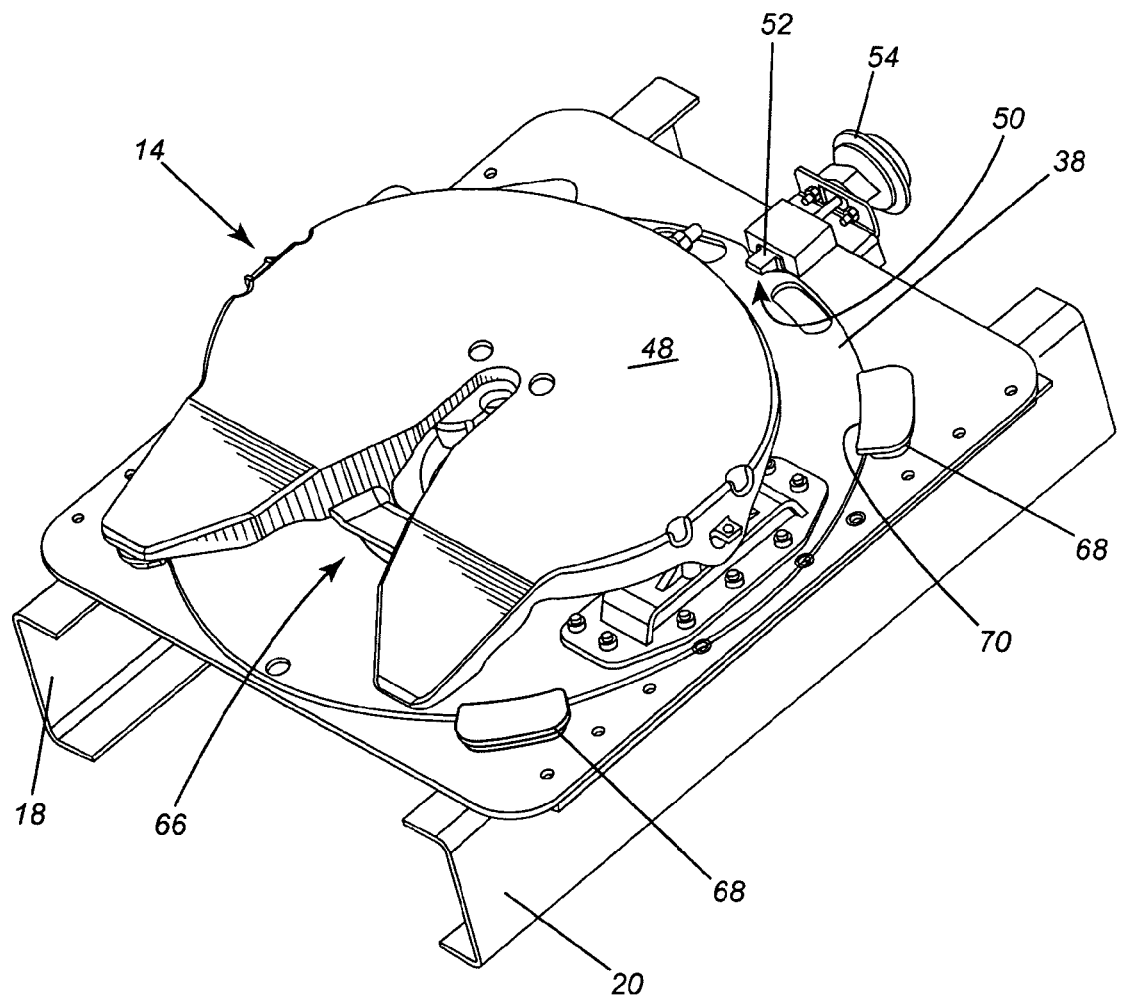
FIG. 3 is a top perspective view of the tractor portion of the fifth wheel.

Referring to the drawings in greater detail and by reference characters thereto, there is illustrated in FIG. 1 a tractor 10 pulling a trailer 12. Tractor 10 and trailer 12 are connected together by means of a king pin 16 on tractor 10 and a king pin receptor device generally designated by reference numeral 14 mounted on the tractor 10.

Figure 4:
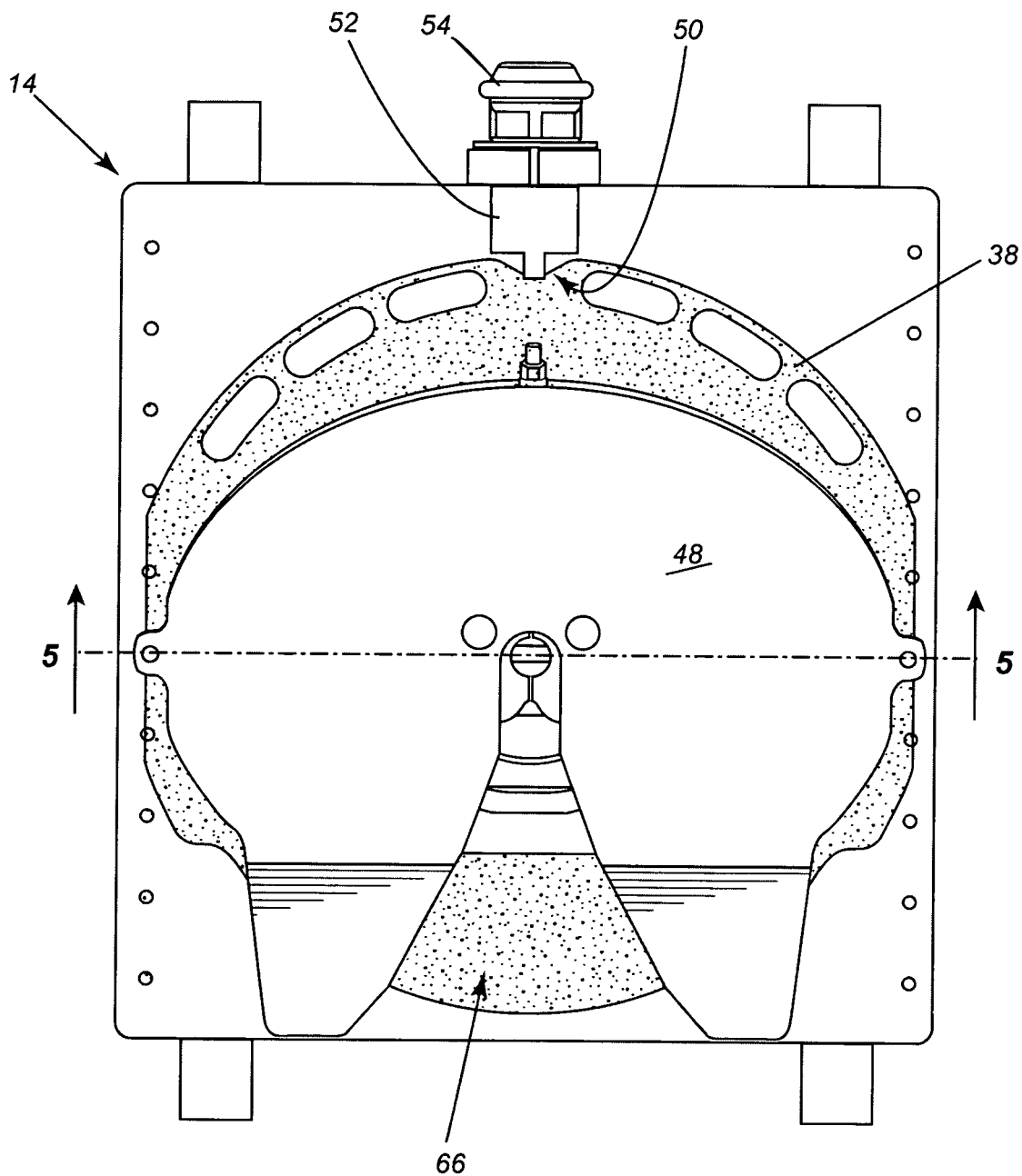
FIG. 4 is a top plan view thereof.
Figure 5:
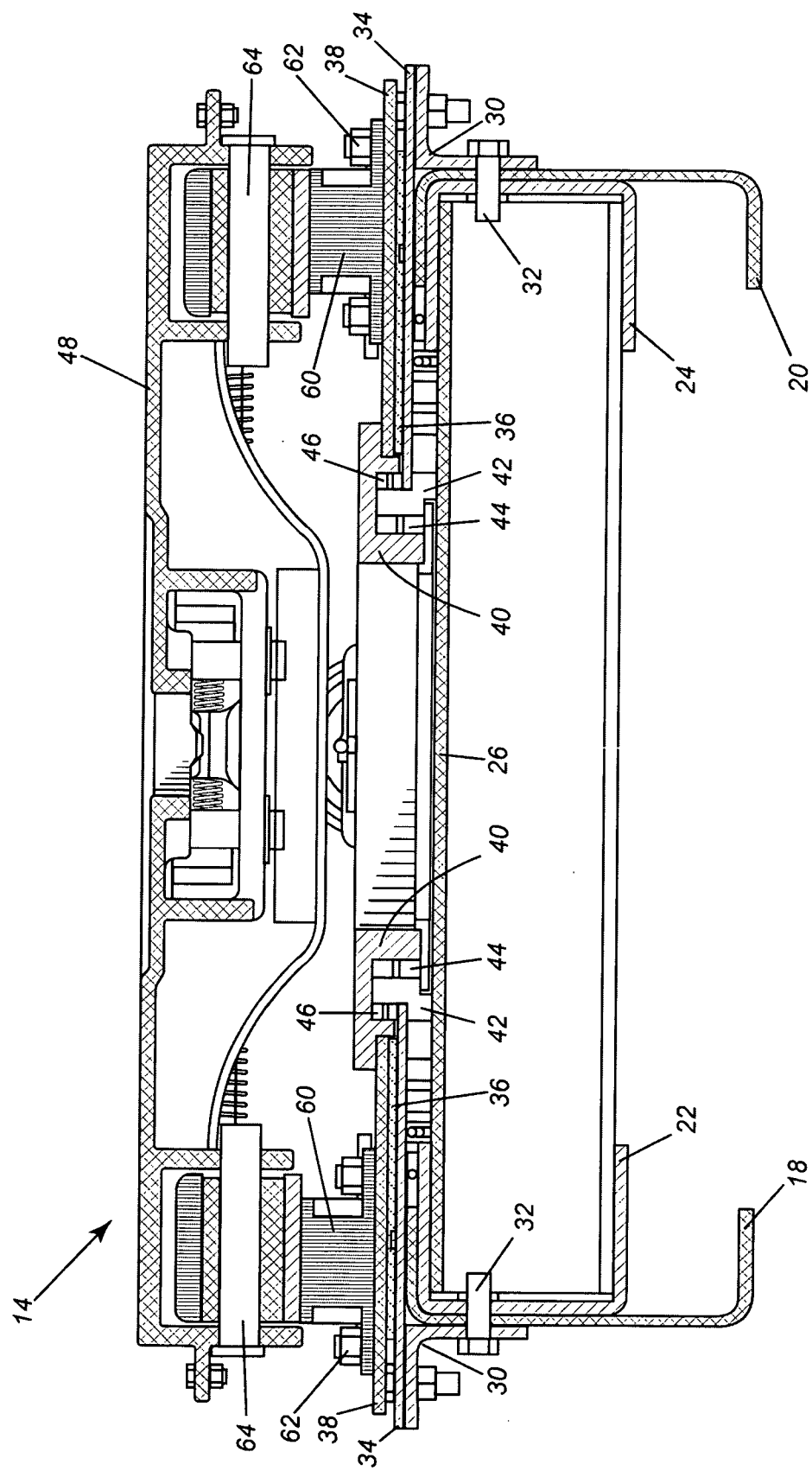
FIG. 5 is a cross-sectional view taken along the lines 5-5 of FIG. 4.
Figure 6:
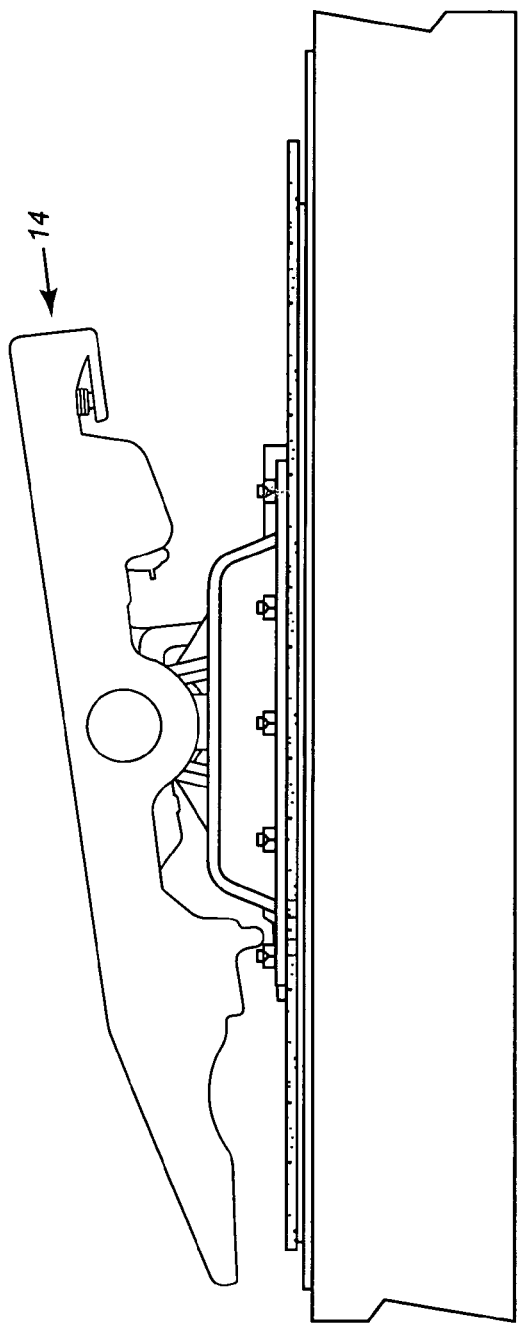
FIG. 6 is a side elevational view illustrating the tractor portion of the fifth wheel coupling.
Figure 7:
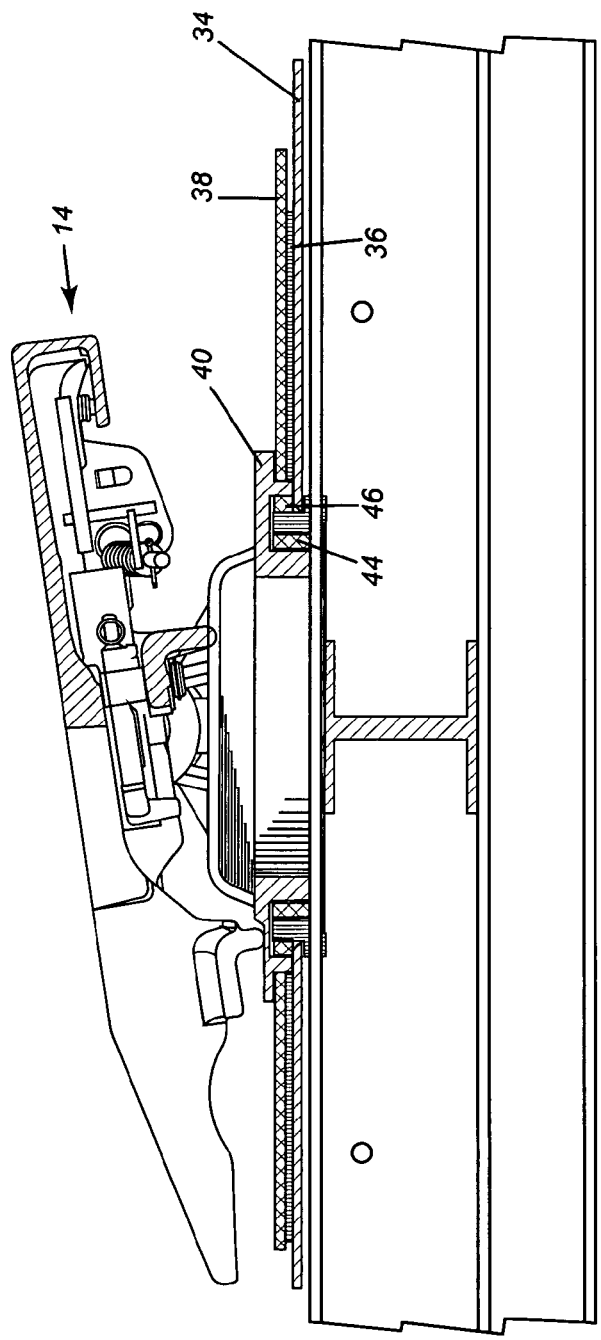
FIG. 7 is a cross-sectional view thereof.

As may be seen in FIGS. 4 and 5, the tractor will include outside frame members 18 and 20 and inside frame members 22 and 24. A cover member 26 extends across the king pin receptor device on the underside thereof between interior frame members 22 and 24. Angle irons 30 are provided on each side adjacent to outside frame members 18, 20. Bolts 32 are utilized to maintain the outside and inside frame members, cover and angle irons 30 together.

Mounted on top of cover 26 is a lower plate member 34. In turn, mounted on top of lower plate 34 is an intermediate plate member 36 which is formed of a low friction material such as PTFE. In turn, an upper plate member 38 is mounted on top of intermediate plate member 36.

A rotatable central portion 40 has housing insert 42 to maintain an inner bearing 44 and an outer bearing 46 in place.

As is conventional, a top plate 48 is provided for king pin receptor device 14.

As may be seen in FIG. 4, a recess 50 is provided in upper plate member 38. A latch member 52 is moveable into and out of engagement with recess 50 by means of a pneumatic activator 54. In this respect, the pneumatic activator 54 can be designed such that when connected to pressurized air, the latch member is released, while when there is no air pressure present, the latch moves into engagement with recess 50.

As may be seen in FIG. 3, a plurality of retaining members 68 each having a flange 70 are mounted so that flange 70 extends over upper plate member 38.

Figure 8:
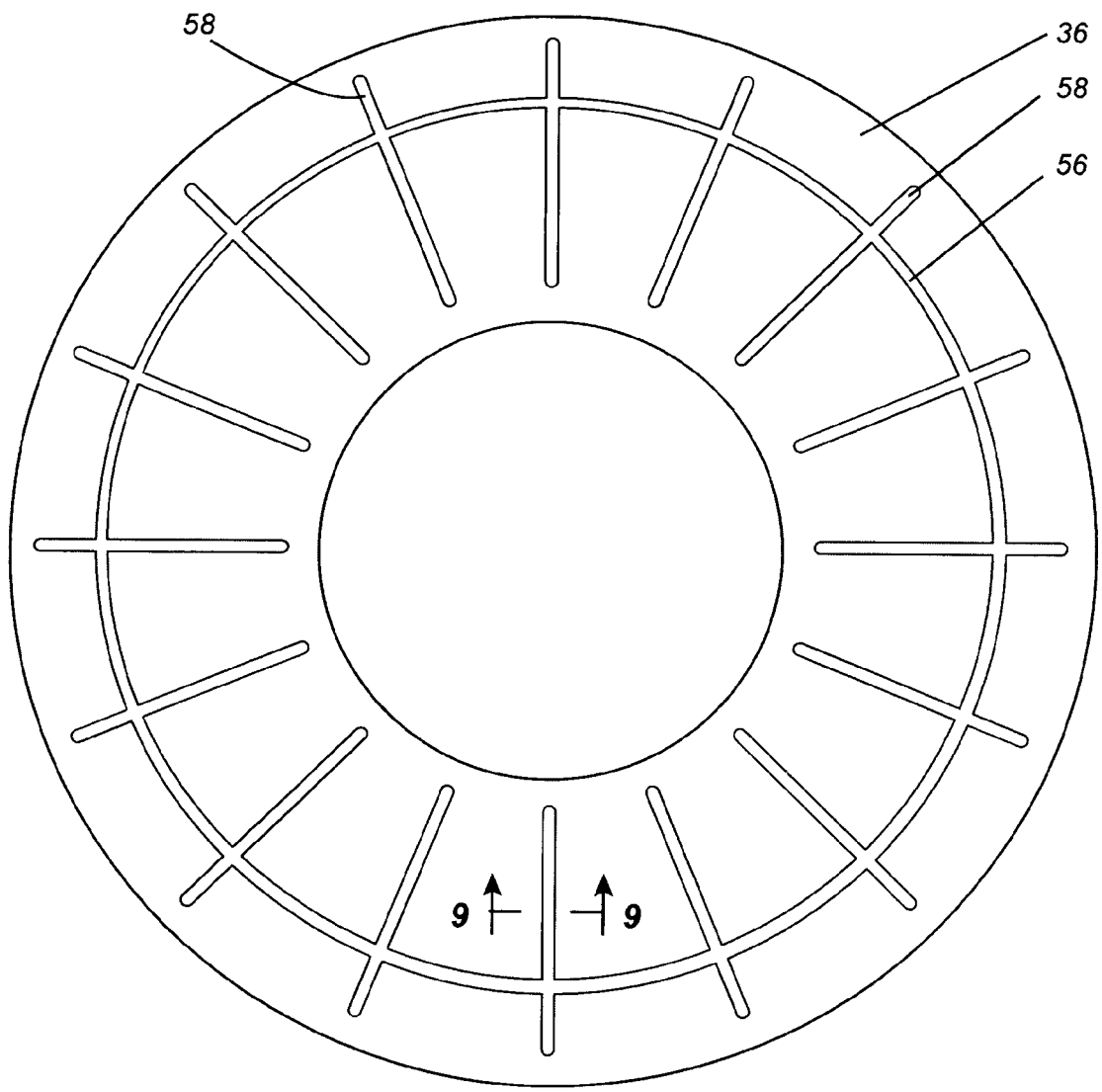
FIG. 8 is a top plan view of the low friction plate.
Figure 9:
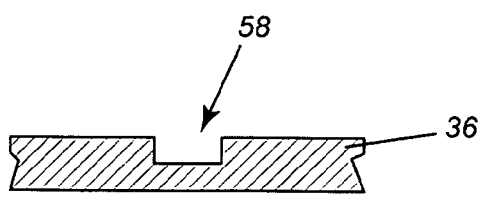
FIG. 9 is a sectional view taken along the lines 9-9 of FIG. 8.

Intermediate plate member 36 which is of a low friction material is illustrated in FIG. 8. As may be seen therein, there is provided on one surface thereof a circular groove 56 along with a plurality of radial grooves 58. Grooves 56 and 58 can be utilized to receive an anti-friction material such as grease. Suitable means such as shown in U.S. Pat. No. 5,411,281 to Bertin Poirier may be utilized for applying the grease as desired.

Support 60 is utilized to support the top plate which has a conventional pin receptor slot 66 which is of a conventional configuration for guiding king pin 16. Bolts 62 are used for securement. It will also be noted that there is a horizontal attachment member 64 as is conventional. The king pin receptor device 14 is known in the art and has been utilized for many years. Any conventional pin receptor device may be utilized.

It will be understood that the above described embodiment is for purposes of illustration only and that changes and modifications may be made thereto without departing from the spirit and scope of the invention.

I claim:

1. A fifth wheel for use between a tractor and trailer wherein said trailer includes a king pin, comprising:
   a frame mounted on said tractor;
   a lower plate member mounted on said frame;
   an intermediate plate member formed of a low friction material, said intermediate plate member being formed on top of said lower plate member;
   an upper plate member covering said low friction layer;
   a coupling support mounted on said upper plate member;
   a king pin retention device mounted on said coupling support; and
   a plurality of retaining members, each of said retaining members being secured to said lower plate member, each retaining member having a flange extending inwardly above said upper plate member.

2. The fifth wheel of claim 1 wherein said intermediate plate has a circular groove formed on an upper surface thereof to receive a lubricant.

3. The fifth wheel of claim 2 further including a plurality of radial grooves intercepting said circular groove.

4. A fifth wheel for use between a tractor and a trailer wherein said trailer includes a king pin, comprising:
   a frame mounted on said tractor;
   a lower plate member mounted on said frame;
   an intermediate plate member formed of a low friction material, said intermediate plate member being mounted on top of said lower plate member;
   an upper plate member covering said low friction layer;
   a coupling support mounted on said upper plate member;
   a king pin retention device mounted on said coupling support; and
   said upper plate member having a recess formed therein at a marginal side edge thereof, a latch member arranged to be inserted in said recess to lock said upper plate member in a fixed position.

5. The fifth wheel of claim 4 wherein said intermediate plate has a circular groove formed on an upper surface thereof to receive a lubricant.

6. The fifth wheel of claim 5 further including a plurality of radial grooves intercepting said circular groove.

* * * * *